OPERATING CIRCUIT FOR PHASE CHANGE MEMORY DEVICES

Filed June 16, 1966

ADAPTIVE TURN-ON

INVENTOR.
DANIEL J. SHANEFIELD
BY Arthur L. Lessler
ATTORNEY

TURN-OFF

ADAPTIVE TURN-OFF

INVENTOR.
DANIEL J. SHANEFIELD
BY Arthur L. Lessler
ATTORNEY

INVENTOR.
DANIEL J. SHANEFIELD
BY Arthur L. Lessler
ATTORNEY

INVENTOR.
DANIEL J. SHANEFIELD
BY Arthur L. Lessler
ATTORNEY

United States Patent Office 3,448,302
Patented June 3, 1969

3,448,302
OPERATING CIRCUIT FOR PHASE CHANGE MEMORY DEVICES

Daniel J. Shanefield, New York, N.Y., assignor to International Telephone and Telegraph Corporation, Nutley, N.J., a corporation of Maryland Filed June 16, 1966, Ser. No. 557,944
Int. Cl. H03k 3/284
U.S. Cl. 307—318 20 Claims

ABSTRACT OF THE DISCLOSURE

This is an operating circuit for controlling and correcting for the deviation in a turn-on voltage of a phase change memory device having two stable states. The circuit applies a control signal to sense the level of the turn-on voltage of the device. The circuit then responds to the sensed condition by delivering a required number of turn-off current pulses to the device to cause the turn-on voltage to fall within an acceptable range of values.

This invention relates to non-rectifying phase change switches, i.e. switching devices exhibiting at least two physical states and capable of being switched between said states by suitable control signals. More specifically, the invention relates to circuit techniques for insuring stable operation of such switches when used as memory devices.

Semiconductive materials which exhibit two or more stable states having different electrical characteristics are well known in the art. For example, Canadian Pat. No. 699,155 to J. F. Dewald, W. R. Northover and A. D. Pearson discloses a family of such materials, comprising compositions of the ternary group arsenic-tellurium-iodine, which exhibit at least two stable conditions, one of said conditions being characterized by a relatively high electrical resistance and the other of said conditions being characterized by a relatively low electrical resistance.

While various theoretical explanations have been advanced for the behavior of such phase change materials, it is now believed that the low resistance state is characterized by an ordered crystalline structure, while the high resistance state is characterized by a structure which is locally ordered but macroscopically amorphous or polycrystalline. When the phase change material is heated above a critical temperature, and is then rapidly cooled it does not have an opportunity to form an ordered crystalline structure and therefore remains in a high resistance state. If the heated material is slowly cooled from the high critical temperature, it resolves itself into an ordered crystalline structure and thereby assumes a relatively low resistance state. It should be emphasized that these materials are macroscopically homogeneous in nature and do not contain barrier layers or P-N junctions; therefore such devices are generally suitable for AC as well as DC operation.

Solid state switching devices employing phase change material such as that disclosed, e.g. in Canadian Pat. No. 699,155 are generally in the form of a mass of such material contacted by at least two spaced electrodes. The phase change material is initially in either its "off" (high resistance) or "on" (low resistance) state. When a device comprised of material which is initially in the "off" state is turned "on" by a suitable voltage applied between its electrodes a channel of "on" material extending between the electrodes is formed.

Similarly, after such a device has been turned "on" and subsequently turned "off" a region of "on" material remains within the mass of "off" material, but the "on" material no longer forms a channel between the electrodes.

Due to the fact that the relative proportions of "on" and "off" material tend to vary with the number of cycles of operation of the phase change switching device as well as with the parameters of the electrical control signals applied thereto, it has heretofore not been possible to achieve stable operation with such devices.

Another disadvantage of such phase change switching devices resides in the fact that the length, diameter and orientation of the conductive channel formed when an "off" device is turned "on" tends to vary from cycle to cycle of operation. The effect of this variation is to cause the device to turn "on" and "off" at different potentials and/or currents in successive cycles, thereby resulting in (i) a cycle to cycle "jitter" effect, and (ii) ultimate "locking" of the device in either the "on" or the "off" state when utilized in conventional circuits.

One possible technique for stabilizing the operation of such phase change switching devices is to turn them either on or off with a sufficiently strong switching signal to insure that substantially all the material in the device is switched to the desired state. Such saturated operation, however, has not proven to be feasible because (a) the switching speed obtainable is limited, (b) large amounts of power are required to perform the switching operation, and (c) the resultant high heat dissipation tends to damage the device.

Another approach to the problem of saturable operation with reasonable switching times and power requirements is disclosed in the copending application of P. E. Lighty, Ser. No. 537,187, filed Mar. 24, 1966 in which the phase change material is embodied in the form of a filament. Due to the small diameter and elongated form factor of this filamentary structure, the channel of "on" (or "off") material is restricted to a single path and occupies substantially the entire volume of the phase change material. This technique, however, is suitable primarily for low power storage and signal application, since the filamentary structure necessarily has a fairly high "on" resistance, and the low volume of the phase change material limits the permissible heat dissipation.

Accordingly, an object of the present invention is to alleviate the jitter and instability problems inherent in phase change switching devices as heretofore used.

Another object of the invention is to provide such improved stability performance without the necessity for modifying the structure of the phase change switching device itself.

Another object of the invention is to simplify the utilization and operation of phase change switching devices by providing suitable circuitry to maintain such devices within a given operating range.

These and other objects which will become apparent by reference to the following detailed specification, the appended claims and the accompanying drawings are realized by applying adaptive circuit techniques to appropriately modify the control signals applied to such phase change switching devices in response to the instantaneous characteristics of the devices themselves. Thus, the adaptive circuitry employed senses the control signal needs of the phase change switching device to which it is connected, and modifies the applied signals in accordance with the instantaneous needs of the device.

The invention will be better understood by reference to the following detailed description taken in conjunction with the accompanying drawings, in which.

Figure 1:
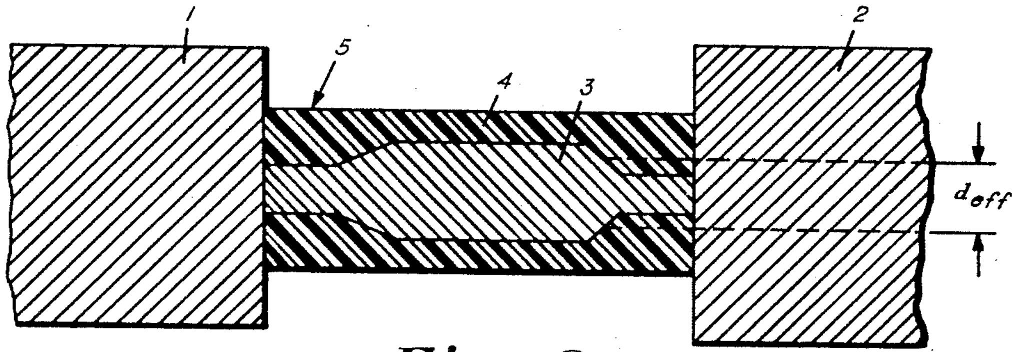
FIG. 1 shows a typical phase change switching device of the unsaturated type, suitable for use according to the present invention.

Referring to FIG. 1 which shows a typical phase change switching device, a mass 5 of phase change material is sandwiched between electrodes 1 and 2. Initially, the entire mass 5 is in its high resistance or "off" state, in which the resistance between electrodes 1 and 2 may be of the order of one megohm or more. An electrical control signal in the form of an increasing voltage is applied between electrodes 1 and 2. As the voltage is increased, the phase change material remains in its "off" state until the voltage reaches an ascertainable threshold value, at which time the material 5 breaks down to form a conducting channel 3 between the electrodes. The effective diameter $d_{eff}$ of the conducting channel will depend upon the amount of heat generated in the phase change material 5, which in turn will depend upon the magnitude and duration of the current supplied by the control signal. The effectvie diameter of the resultant channel 3 is a measure of the extent to which the device has been turned "on," or its "on-ness." If the phase change material 5 is then alowed to gradually cool, e.g. by gradually decreasing the current therethrough, the channel 3 will remain in its low resistance state. The "on-ness" of the device may be increased by applying a succession of turn-on pulses thereto.

The phase change switching device shown in FIG. 1 may be turned "off" by application of a current therethrough of sufficient magnitude to melt or disarrange at least a portion of the channel 3 throughout its entire cross-section. If such a current is applied and suddenly removed, part of the channel 3 will then rapidly cool into its amorphous or polycrystalline high resistance state.

In this condition a portion of the channel 3 remains in the "on" state but part of the channel is converted to "off" material throughout its cross-section, thus reinstating the high resistance previously exhibited between electrodes 1 and 2. The amount of "on" material 3 which is converted to "off" material 4 will depend upon the magnitude and duration of the turn-off current as well as upon the waveform of said current which will determine the rate of cooling of the phase change material.

Since the device now contains a partial channel of "on" material, the next time the device is turned "on" a smaller turn-on voltage will cause breakdown of the phase change material 5 between electrodes 1 and 2. Similarly, the harder the device is turned "off" (i.e. the smaller the amount of "on" material 3 remaining), the larger must be the next turn-on voltage to cause breakdown. Thus, for stable performance such phase change memory devices require switching voltages and/or currents which depend upon their past histories of operation.

Figure 2:
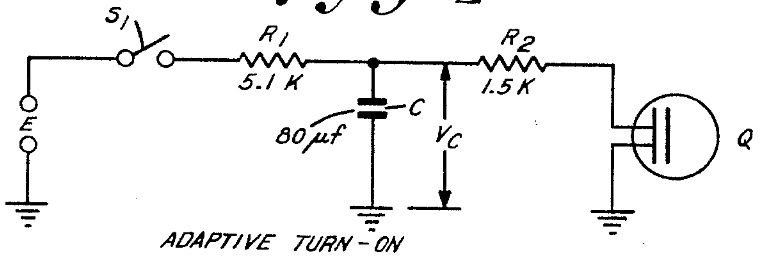
FIG. 2 shows a circuit for adaptively turning "on" the device of FIG. 1.

Accordingly, the present invention provides circuitry to sense the "off-ness" of the phase change switching device, and to modify the current empolyed to turn the device "on" so that the "off-ness" is caused to fall within a desired range. Referring to FIG. 2, a voltage source E is coupled to a phase change switching device through the resistance-capacitance network consisting of R1, R2 and C. The voltage E has a sufficient magnitude to break down the phase change device Q even when the device is in its saturated "off" condition, i.e. when substantially all the phase change material in the switching device is "off" material. Due to the presence of the capacitance C, the voltage across the device Q will gradually rise (with a time constant equal to $R_1C$) until the breakdown voltage of the device Q is reached. At this point the device Q will break down, forming a channel of "on" material therein, and exhibit a low resistance between its terminals. The peak current drawn from the circuit at the moment the device Q breaks down is approximately equal to $V_cR_2$, where $V_c$ is the instantaneous voltage across the capacitor C. If the device Q breaks down at a voltage higher than that desired, the peak current supplied will be relatively large; similarly, if the device Q breaks down at a lower voltage than that desired the peak current will be relatively small. Since the break-down voltage of the device is a measure of the "off-ness" thereof, the circuit will serve to maintain this "off-ness" within a desired range.

The manner in which the circuit controls the device "off-ness" is as follows. Assume that the device is initially in its saturated "off" condition, so that substantially all the phase change caterial 5 (FIG. 1) is "off" material. Assume, further, that the corresponding breakdown voltage of the device is approximately 110 volts and that the source E provides a DC voltage of approximately 200 volts. When the switch $S_1$ is closed the voltage across the capacitor C, and consequently across the device Q (since the device Q is in its non-conducting or "off" condition there is substantially no voltage drop across $R_2$) will rise from zero toward the source voltage of 200 volts with a time constant equal to $R_1C$. Typically, $R_1$ may be 5100 ohms, $R_2$ may be 1500 ohms and C may be 80 microfarads. When a potential of 110 volts is attained across the capacitance C, the device Q will break down. Assuming the effective resistance $R_q$ of the device Q after breakdown to be approximately 200 ohms (the "on" resistance of the device Q is non-linear and current dependent), the peak current supplied through the device will be 110 volts divided by 1700 ohms or approximately 65 milliamperes (ma.). FIGS. 3*a* and 3*b* show the voltage and current waveforms across the device Q during this turn-on operation.

Immediately after the device breaks down, the voltage across the device will drop to a low residual value $V_{on}$ determined by the circuit parameters and the "on" resistance of the device. The current through the device will decay from the peak value of approximately 65 ma. toward a quiescent value equal to $E/(R_1+R_2+R_q)$ or approximately 200/6000=29 ma. The time at which the device Q initially breaks down is denoted in FIG. 3 as $t_a$. After switch $S_1$ is subsequently opened at a time denoted by $t_b$ in FIG. 3, both the voltage across and current through the device Q will decay toward zero. It is essential that the current through the device Q decay relatively slowly so that the device may form one or more channels of "on" material to maintain the device in its "on" condition after the applied control signals have been removed therefrom; the capacitor C assures such a gradual decay, the time constant being $(R_2+R_q)C$. The decay time may preferably be a minimum of 100 milliseconds. The effective diameter $d_{eff}$ of the channel of "on" material thus formed depends upon the area under the current waveform of FIG. 3*b*, which in turn depends upon the peak value of the current through the device. Since a relatively large amount of peak turn-on current (65 ma.) has been applied, the effective diameter $d_{eff}$ of the "on" channel 3 (FIG. 1) will be fairly large. Therefore, when the device is subsequently turned off (by a non-adaptive circuit), a relatively large proportion of "on" material will remain within the "off" region 4 (FIG. 1). This residual "on" region will lower the breakdown voltage of the device Q the next time it is turned "on."

Assuming that the device Q is thus subsequently turned "off," with a resultant "off-ness" now corresponding to a lower break-down voltage, say 50 volts, the peak current supplied when the circuit of FIG. 2 is employed to subsequently turn the device "on" once more will be approximately 50 v./1700 ohms=29 ma., as compared to the 65 ma. which was applied when the "off-ness" of the device corresponded to a breakdown voltage of 110 volts.

Thus, the harder the device is "off" the harder the adaptive circuit of FIG. 2 tends to turn it "on." Similarly, if the "off-ness" of the device is less than that desired, the circuit of FIG. 2 tends to turn the device "on" less hard, resulting in increased "off-ness" the next time the device is turned "off."

Figure 3:
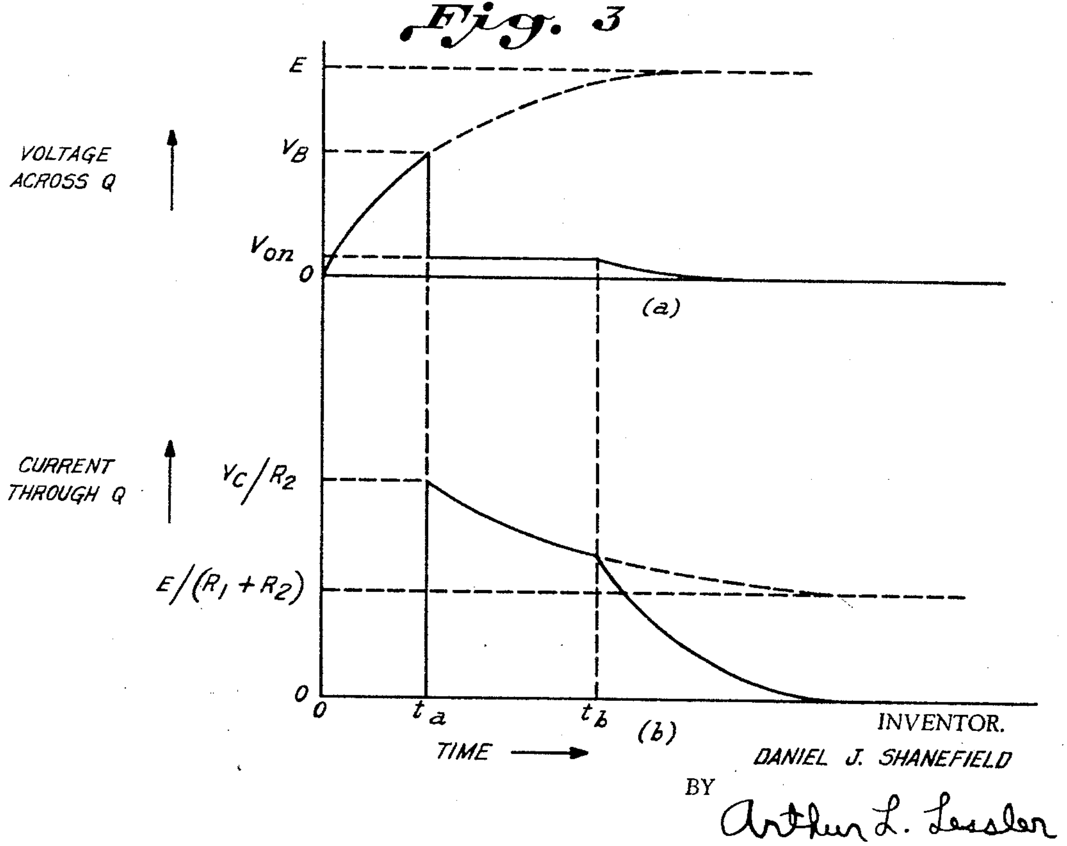
FIG. 3 shows waveforms associated with the operation of the circuit shown in FIG. 2.

It can be seen in FIGS. 2 and 3 that maximum adaptive capability of the circuit is achieved by providing as high a ratio of peak current to quiescent current as the circuit is capable of supplying. Since the quiescent current is approximately equal to $E/(R_1+R_2+R_q)$ while the peak current is equal to a maximum of $E/(R_2+R_q)$, it is desirable that $R_1$ be substantially larger than $R_2$.

Figure 4:
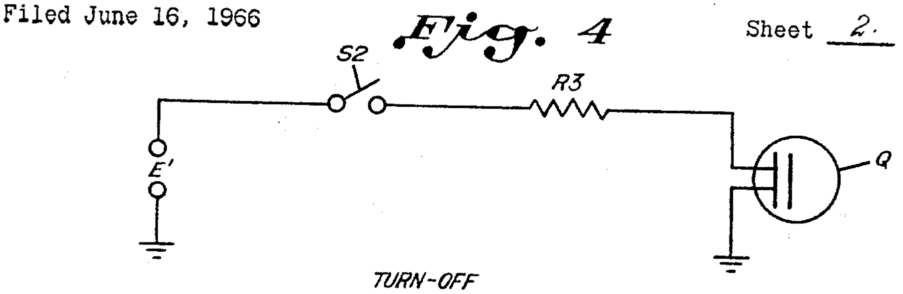
FIG. 4 shows a circuit for non-adaptive "turn-off" of the phase change switching device.
Figure 5:
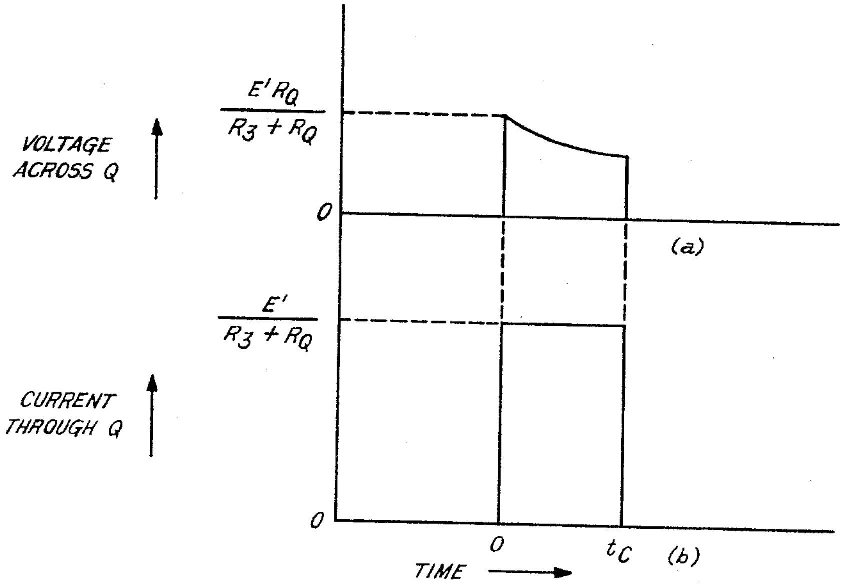
FIG. 5 shows waveforms associated with the operation of the circuit of FIG. 4.

FIG. 4 shows a simple circuit for turning off the device Q after it has been turned on by the adaptive circuit of FIG. 2. The values of E' and $R_3$ are chosen so as to supply a substantial current through the "on" device Q so as to melt or disarrange at least a portion of any conducting paths 3 (FIG. 1) within the device Q throughout their entire cross section. The switch $S_2$ is opened after a short interval (typically about 5 milliseconds), thus casuing the current through the device Q to abruptly decrease to zero. This abrupt decrease in current causes the device Q to assume its "off" condition, since the device cools too rapidly to enable ordered crystallization to occur therein, so that no complete conducting paths between the device electrodes are formed. The waveforms associated with the turn-off operation are shown in FIG. 5. Typically, a turn-off current of approximately 250 ma. may be employed when devices of the type disclosed in Canadian Pat. No. 699,155 are utilized. The voltage across the device Q during the turn-off operation is approximately equal to the peak current multiplied by the effective "on" resistance of the device, which may be of the order of 200 ohms or so, although this resistance will vary considerably during the turn-off period. Thus, typically, the voltage developed across Q when a 250 ma. turn-off current is employed may be of the order of 40–50 volts.

Although FIG. 2 is directed to a circuit which adaptively turns "on" phase change switching devices, it is also possible to realize a circuit which adaptively turns "off" such devices. Normally, a non-adaptive turn-on circuit, such as that shown in FIG. 14 of Canadian Pat. No. 699,155 will be employed when an adaptive turn-off circuit is utilized.

Although the "off-ness" of a phase change switching device may be approximately monitored by sensing the value of the required "turn-on" breakdown voltage, no simple measure of the "on-ness" (as specified, e.g., by the effective diameter $d_{eff}$ of the conducting channel of "on" material) is readily available to facilitate adaptive turn-off. Therefore, the adaptive turn-off circuit must apply a specific turn-off pulse to the device, than measure the resultant device "off-ness," and apply another turn-off pulse if the sensed "off-ness" is not sufficiently high. This pulsing is continued until the desired degree of "off-ness" is attained.

Figure 7:
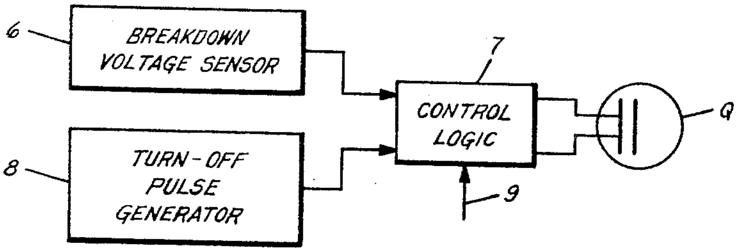
FIG. 7 shows a block diagram of a circuit for adaptively turning "off" the device.

Referring to FIG. 7, which shows an adaptive turn-off circuit, a breakdown voltage or "off-ness" sensor 6 is connected to the device Q through suitable control logic circuitry 7, as is a turn-off pulse generator 8. A suitable control signal 9 is employed to initiate the turn-off operation. Upon receipt of the "turn-off" signal 9, the control logic 7 connects the "turn-off" pulse generator 8 to the device Q. The turn-off pulse generator 8 then applies a pulse of rectangular form having fixed amplitude and duration to the device Q; the turn-off pulse supplied may typically have an amplitude of 250 ma. and a duration of 5 milliseconds. After the turn-off pulse supplied by the generator 8 has terminated the control logic 7 connects the breakdown voltage sensor 6 to the device Q so that the sensor can determine whether the breakdown voltage of the device Q is within the desired range. If the breakdown voltage is within the desired range, the control logic 7 disconnects both the sensor 6 and the generator 8 from the device Q. If, however, the sensor determines that the breakdown voltage is less than the desired value, the control logic reconnects the "turn-off" pulse generator to the device Q so that another "turn-off" pulse is applied thereto. The breakdown voltage is once again sensed and the cycle repeated until the desired "off-ness" is attained.

Figure 8:
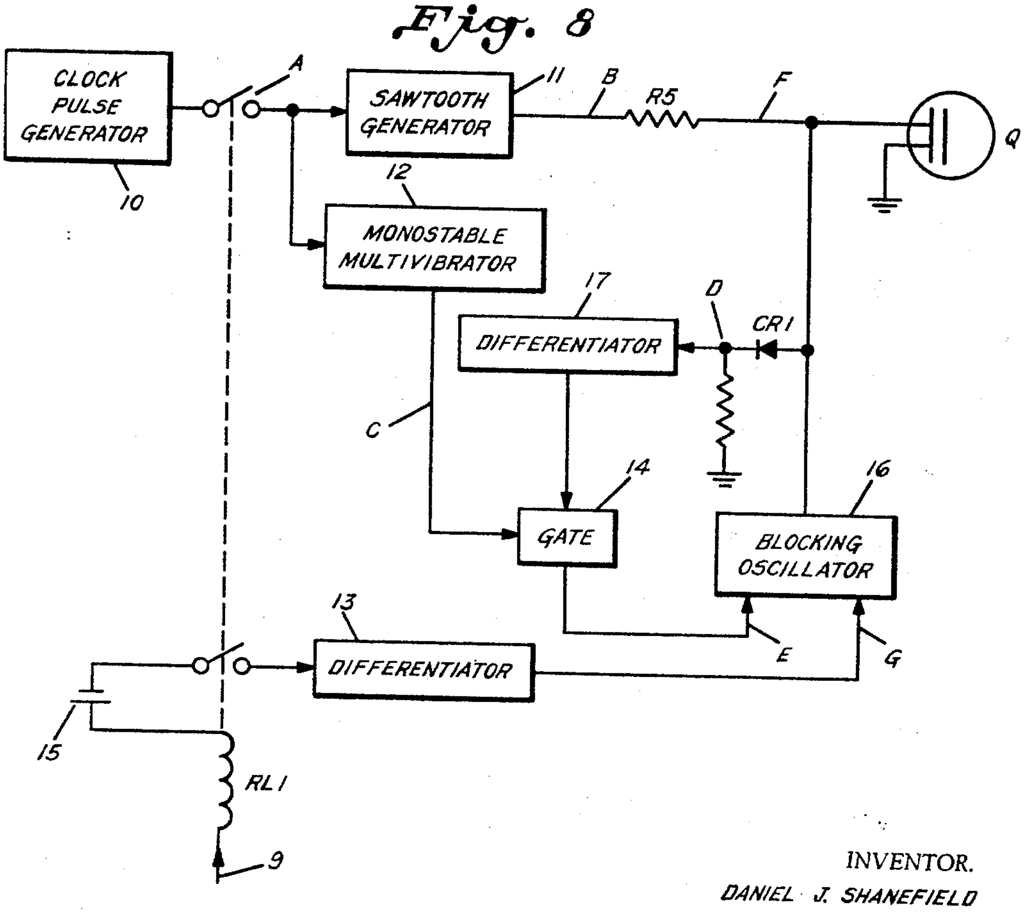
FIG. 8 shows a functional block diagram of a preferred circuit for adaptively turning off the device.

FIG. 8 shows a detailed functional block diagram of an adaptive turn-off circuit utilizing the principles described in connection with the foregoing discussion of the block diagram of FIG. 7. The interrelationships of the various elements of FIG. 8 are such that these elements cannot be readily associated with corresponding blocks of FIG. 7.

A clock pulse generator 10 continuously generates a series of pulses spaced apart by an interval substantially longer than the width of the turn-off pulses to be utilized. Typically, turn-off pulses having a width of approximately 5 milliseconds are employed; the spacing between clock pulses may be on the order of 10–25 milliseconds.

The turn-off signal 9 is employed to activate relay RL1, thus closing the relay contacts. Upon contact closure, the battery 15 is connected to the differentiating network 13 so that the sudden change of potential at the input of the differentiating network causes the network to generate a sharp pulse at the moment the relay contacts are closed. This single pulse, the waveform of which is shown at G in FIG. 9, triggers the blocking oscillator 16, thus causing the blocking oscillator to generate a suitable turn-off pulse which is coupled to the phase change device Q. This initial turn-off pulse causes the device Q to assume at least some degree of "off-ness."

Assuming that this initial degree of "off-ness" corresponds to a device break-down voltage $V_a$, the following events occur. The next pulse generated by the clock pulse generator 10 after the relay contacts have closed triggers monostable multi-vibrator 12 and sawtooth generator 11. The width of the pulse generated by the monostable multivibrator 12 is such that at the instant the generated pulse terminates, the amplitude of the sawtooth at the phase change device terminals is equal to the breakdown voltage $V_d$ corresponding to the desired degree of "off-ness" of the device Q which is to be produced by the circuit.

As the sawtooth voltage impressed upon the device Q increases, the device will break down at the voltage $V_a$ corresponding to its initial "off-ness." The sudden drop in voltage at the device terminals when breakdown occurs is coupled to differentiating circuit 17 through diode CR1, so that the output of the differentiating circuit contains a sharp negative pulse at the moment of device breakdown. Since the pulse output of monostable multivibrator 12 is then present at gate 14, the differentiating network output will be coupled through gate 14 to trigger blocking oscillator 16. The blocking oscillator 16 will then generate an additional turn-off pulse to further increase the "off-ness" of device Q. The diode CR1 prevents this turn-off pulse from coupling back into differentiating network 17.

Assuming that this additional turn-off pulse has increased the "off-ness" of device Q to a condition corresponding to a higher breakdown voltage $V_b$, the next sawtooth voltage waveform appearing at the device terminals (after triggering of the sawtooth generator by the next clock pulse) will rise to a value $V_b$ before the voltage suddenly drops when the device breaks down. Once again, the corresponding pulse generated by differentiating network 17 will be coupled through gate 14 to trigger blocking oscillator 16 for generation of another turn-off pulse. This process will continue until the "off-ness" of the device Q corresponds to a breakdown voltage in excess of $V_d$, the desired value. When the device Q now breaks down at a potential higher than $V_d$, the corresponding pulse generated by differentiating network 17 is no longer coupled through gate 14, since the pulse output of monostable multivibrator 12 has terminated.

Figure 9:
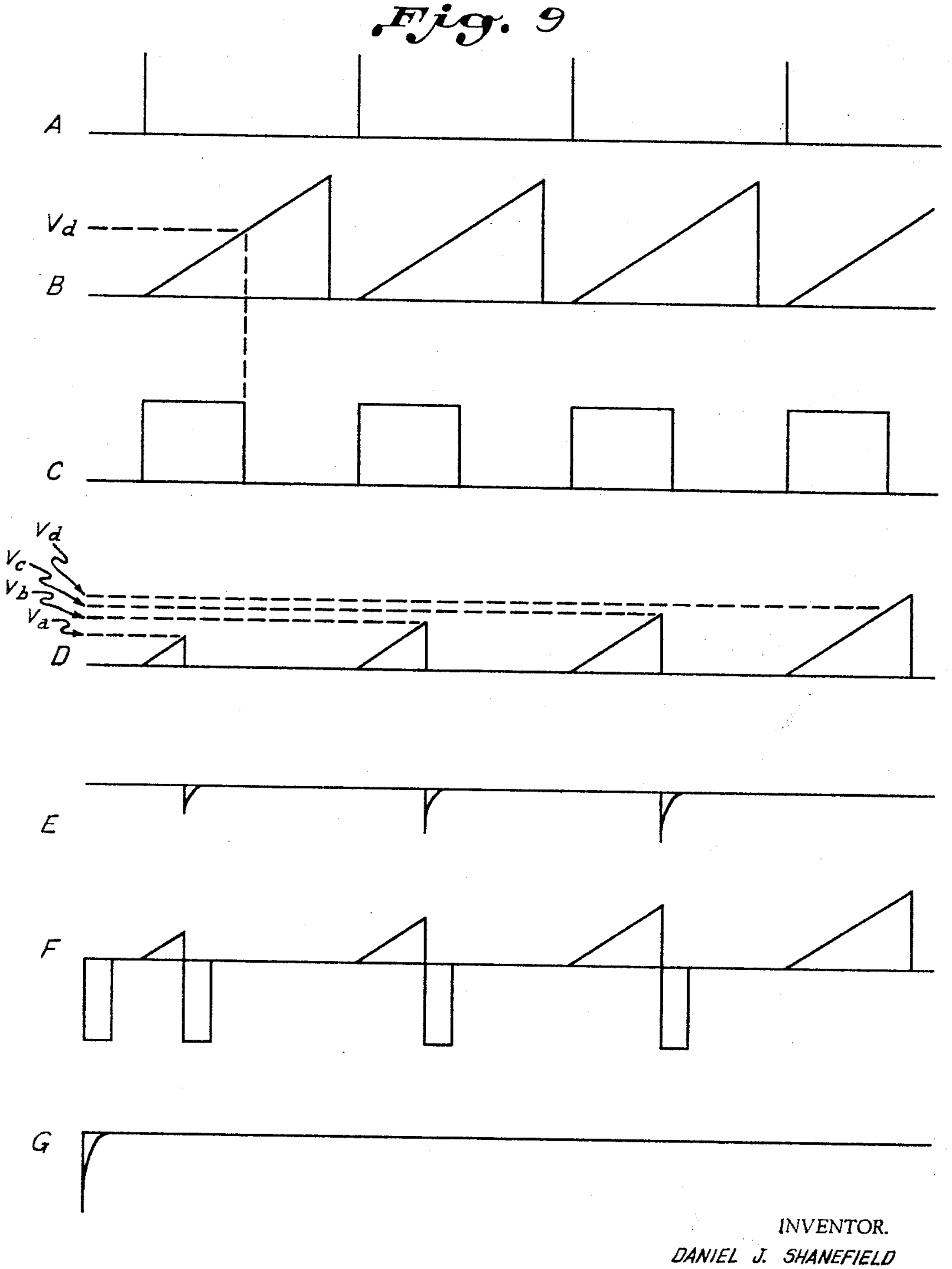
FIG. 9 shows waveforms to facilitate understanding of the operation of the circuit of FIG. 8.

As may be seen from FIG. 9, the waveform at the device terminal F (FIG. 8) contains positive portions corresponding to the various sawtooth voltage waveforms, and negative portions corresponding to the turn-off pulses generated by blocking oscillator 16. Even though a positive sawtooth waveform is employed for sensing the device breakdown voltage and a negative waveform is employed for turning off the device, the device Q is substantially insensitive to polarity and therefore switches properly under these circumstances. The resistor $R_5$ should be chosen so that the current supplied by sawtooth generator 11 upon breakdown of the phase change device Q is insufficient to substantially affect the physical state of the device.

In addition to the foregoing examples of adaptive turn-on employed in conjunction with conventional turn-off and vice versa, it is possible to employ adaptive circuitry for both the turn-on and turn-off operations, and the present invention is applicable to this technique also.

Figure 6:
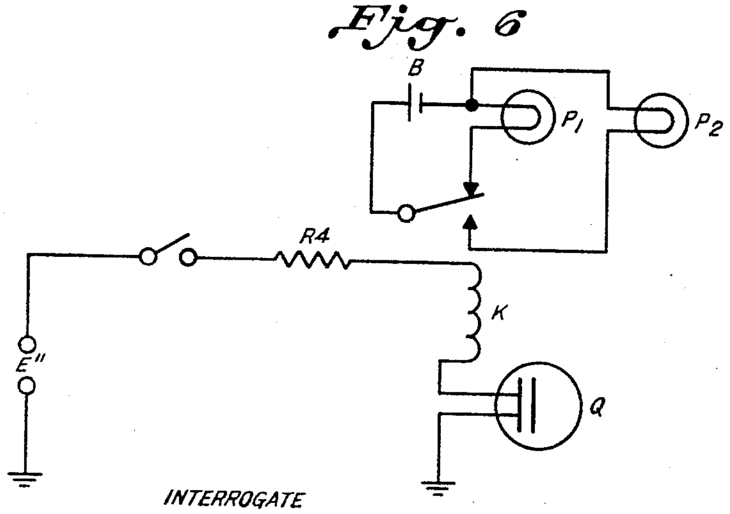
FIG. 6 shows a circuit for determining whether the device is "on" or "off."

FIG. 6 shows a circuit which may be used for interrogating the device Q to determine whether it is in its "on" or "off" condition, when the device is used as a memory element. It has been experimentally observed that when phase change switches of the type disclosed in Canadian Pat. No. 699,155 are turned on and allowed to remain in this condition for a period of time, the devices tend to partially turn "off." Referring to FIG. 1, this phenomenon is believed to be the result of tiny breaks or microcracks in the conducting channel 3 of "on" material. Whenever such a break occurs, the conductive path between the electrodes 1 and 2 must traverse the break by passing through a small region of "off" material in the vicinity of the defect.

It has also been discovered that the partial "off-ness" attained by phase change switching devices which have been turned "on" and allowed to remain in the "on" condition tends toward a limiting value corresponding to a critical breakdown voltage. As the device is allowed to age further, the "on" condition is characterized by a partial "off-ness" corresponding to breakdown voltages closer and closer to the critical value. It is therefore evident that to reliably ascertain whether the device is in its "on" or "off" condition, it is necessary to measure the breakdown voltage to determine whether the critical value has been exceeded.

This measurement may be accomplished by applying a voltage E'' (FIG. 6) to the device Q through a suitable resistance. The voltage E'' should be substantially equal to the critical value approached by "on" devices subject to the aforementioned partial "turn-off" phenomenon. Typically, devices of the type disclosed in Canadian Pat. No. 699,155 may be characterized by critical voltages of the order of 50 volts or so. The interrogating current applied to the device Q should be less than the maximum permissible "turn-on" current for the device; otherwise the interrogating circuit may turn "on" the device so hard that it will be difficult or impossible to turn "off."

Again referring to FIG. 6, the resistance $R_4$ limits the interrogating current applied to the device Q to the desired value. The relay K senses the presence or absence of current through the device Q and activates a corresponding one of the pilot lights $P_1$ and $P_2$ through the circuit consisting of the corresponding relay contacts and the battery B to illuminate one or the other light in accordance with the condition of the device.

Due to the partial "turn-off" phenomenon experienced when phase change switching devices are left in the "on" condition for considerable periods of time, the line dividing the "off" and "on" states becomes a rather arbitrary one. The "on" state may then be defined as that for which the breakdown voltage of the device is less than the aforementioned critical value while the "off" state is characterized by a breakdown voltage in excess of said critical value. The interrogating voltage E'' should be substantially equal to the critical value, for if it is less those "on" devices which have partially turned "off" will not be properly evaluated; if "E" is too large, the interrogating circuit may actually turn "on" devices which are in the "off" condition. The purpose of the interrogating circuit is merely to determine which of the two conditions the device is in and not to alter the device state, i.e. not to cause switching between the "on" and "off" states as defined above.

While the principles of the invention have been described above in connection with specific embodiments, and particular modifications thereof, it is to be clearly understood that this description is made only by way of example and not as a limitation on the scope of the invention.

What is claimed is:

1. An operating circuit to control the deviation in an electrical characteristic of a phase change memory device having a selected one of two physical states, comprising:
- means for applying therein a control signal to sense said electrical characteristic of said device; and
- means responsive to said characteristic for delivering an electrical pulse to said device to cause said characteristic to fall within a given range of values.

2. A circuit according to claim 1, wherein said device has at least two electrodes,
- one of said physical states is characterized by a relatively low electrical resistance between said electrodes, and
- the other of said physical states is characterized by a relatively high electrical resistance between said electrodes.

3. A circuit according to claim 2, wherein said selected state is said low resistance state, said electrical characteristic is a threshold voltage required to cause said device to assume said low resistance state and said applying means includes a source of increasing voltage, the amplitude of said voltage exceeding the maximum of said threshold voltage.

4. A circuit according to claim 3, wherein said responsive means includes means for applying a current through said device after said voltage amplitude exceeds said threshold voltage, the peak value of said current increasing with increase of said threshold voltage and decreasing with decrease of said threshold voltage.

5. A circuit according to claim 4, wherein said applied current gradually decreases from said peak value.

6. A circuit according to claim 4, wherein said current applying means includes:
- first and second electrical resistance elements connected in series between a terminal of said voltage source and one of said electrodes, said first resistance element being closest to said terminal; and
- a capacitor connected between the junction of said resistance elements and the other of said electrodes,
- the resistance of said first element being substantially greater than the resistance of said second element.

7. A circuit according to claim 2, wherein said selected state is said high resistance state, said electrical pulse is a threshold current pulse required to cause said device to assume said high resistance state, and said applying means includes a source of current, the amplitude of said current exceeding the maximum of said threshold current pulse.

8. A circuit according to claim 7, wherein said responsive means includes:
- means for ascertaining whether the threshold voltage of said device associated with said high resistance state exceeds a predetermined value; and
- means further responsive to said ascertaining means, said further responsive means applying current to said device when said threshold voltage is less than said predetermined value.

9. A circuit according to claim 8, wherein said further responsive means generates additional current pulses as long as said threshold voltage is less than said predetermined value.

10. A circuit according to claim 8, wherein said applied current rapidly decreases from its peak value.

11. An operating ciruit according to claim 7, wherein said generated current pulses having a rapidly decreasing trailing edge.

12. An operating circuit according to claim 7, wherein the waveform of said generated current pulses are substantially rectangular.

13. A circuit according to claim 3, wherein said source generates voltage pulses, the trailing edge waveform of said pulses having a fall time not less than 100 milliseconds.

14. An interrogating circuit for a phase change switching device having a plurality of physical states, one of said states being characterized by a relatively low electrical resistance, said relatively low electrical resistance being exhibited when said device is subjected to a voltage in excess of a variable lower threshold value, said variable lower threshold value being always less than a predetermined critical voltage, comprising:

means for applying an electrical signal to said device, the voltage of said signal having an amplitude not less than said critical voltage;

means for sensing the electrical resistance of said device when said critical voltage is applied; and means for indicating whether said sensed resistance corresponds to said relatively low electrical resistance.

15. A circuit according to claim 14, wherein said signal is such that the physical state of said device is the same after said signal is applied as it is before said signal is applied.

16. A process for operating a phase change memory device to control the deviation in an electrical characteristic of said device, said device being capable of assuming a selected one of two physical states, comprising the steps of:

applying said control signal to said device;

sensing said characteristic; and delivering an electrical pulse in response to said sensed characteristic, to cause said characteristic to fall within a given range of values.

17. A process according to claim 16, wherein:

said selected state is characterized by a relatively low electrical resistance, said control signal is a voltage pulse, said sensed characteristic is the instantaneous value of said voltage just before said device assumes said low resistance state; and said electrical pulse is the peak value of the current through said device associated with said voltage pulse just after said device assumes said low resistance state.

18. A process according to claim 11, wherein said associated current gradually decays from said peak value.

19. A process according to claim 16, wherein:

said selected state is characterized by a relatively high electrical resistance, said electrical pulse is a current pulse, said sensed characteristic is the breakdown voltage of said device after said current pulse has substantially terminated, and said current pulse is delivered the number of times necessary to cause said voltage breakdown to fall within said given range of values.

20. A process according to claim 13, wherein the amplitude of said current pulse rapidly decreases from its peak value.

References Cited

UNITED STATES PATENTS

| | | | |
|---|---|---|---|
| 2,948,837 | 8/1960 | Postal | 317—234 XR |
| 3,271,591 | 9/1966 | Ovshinsky | 307—88.5 |

ARTHUR GAUSS, *Primary Examiner.*

J. ZAYWORSKY, *Assistant Examiner.*

U.S. Cl. X.R.

307—256; 315—133, 136; 317—234